Sept. 8, 1953
R. THEILE
TELEVISION TRANSMISSION FROM INTERMITTENT FILM BY MEANS OF PULSED PICKUP TUBE
Filed May 8, 1950
2,651,674

Inventor
Richard Theile
By Emery, Holcombe & Blair
Attorney

Patented Sept. 8, 1953

2,651,674

UNITED STATES PATENT OFFICE 2,651,674

TELEVISION TRANSMISSION FROM INTERMITTENT FILM BY MEANS OF PULSED PICKUP TUBE

Richard Theile, Cambridge, England, assignor to Cathodeon Limited, Cambridge, England, a British company Application May 8, 1950, Serial No. 160,636
In Great Britain April 20, 1949

12 Claims. (Cl. 178—7.2)

The present invention relates to the television transmission of cinematograph films and, more particularly, to a method and apparatus for film scanning which utilizes a video storage tube of the kind employing high velocity scanning, such as of the types known as iconoscopes and image iconoscopes.

Such tubes essentially comprise a target having a storage surface backed by an electrode termed "a signal plate," the storage surface being capable of carrying a charge pattern corresponding to the point by point brightness values of a light image focussed on the tube. In the case of tubes of the image iconoscope type, the storage surface is secondary emitting and the tube has a photo-cathode upon which the light image is focussed and which, in response thereto, releases photo-electrons which are accelerated and focussed onto the storage surface of the target to form the charge pattern by secondary emission from the storage surface. In the case of tubes of the iconoscope type, the storage surface is a photo-sensitive mosaic upon which the light image is focussed to form the charge pattern by photo-emission from the storage surface. In either case, the charge pattern on the storage surface is evaluated by a high velocity scanning beam of electrons the effect of which is to generate a train of signal pulses in the signal plate which constitute the output video signal of the tube. A collector electrode arranged in the tube near the storage surface collects electrons emitted from the storage surface under the action of the incident photo-electrons in the case of the image iconoscope, or the incident light in the case of the iconoscope, and under the action of the scanning beam. In the normal operation of such tubes, the storage surface is restored at each scanning to an equilibrium potential from which the charge storage process starts at each point of the storage surface in accordance with the light value of the corresponding point of the light image. Under the conditions of high velocity scanning as employed in such tubes, the storage surface assumes an equilibrium potential approximating the operating potential of the collector electrode.

Such video storage tubes suffer from a number of disadvantages, and at present are used exclusively for direct pick-up transmissions, it being the practice to install and utilize other scanning devices, such as image dissectors and flying spot scanners, exclusively for film transmissions.

In copending application No. 160,688 filed May 8, 1950, for "Apparatus Incorporating a Video Storage Tube and Method of Operating Same," to which reference is hereby made, a method of and apparatus for minimising the effects of the disadvantages of such video storage tubes is disclosed in which, periodically during the flyback periods of the scanning beam, preferably during the frame flyback periods, the storage surface of a video storage tube is submitted to the simultaneous and combined actions of an irradiation causing the storage surface to emit electrons, and of a field causing the emitted electrons to return to the storage surface, so as to cause the storage surface to be charged negatively relatively to its normal equilibrium potential (normal collector potential), whereby the equilibrium potential or average equilibrium potential of the storage surface is changed from that which it would normally attain during the flyback periods, thus modifying the operating point of the tube. In this way, the storage surface is made more negative to the collector electrode than it would normally be, and consequently a greater number of the electrons emitted from the storage surface in response to the light image or the scanning beam can be collected by the collector electrode.

An object of the present invention is to apply the method and apparatus disclosed in the aforesaid application to film scanning, whereby to provide an improved method and apparatus for film scanning.

In film scanning it is possible to use illumination of such intensity that it is only necessary to project the picture on to the storage tube during the frame flyback periods. This can be effected with a conventional film projector having intermittent film feed motion.

According to the present invention, for television transmission of cinematograph films, the film is intermittently projected on to a video storage tube of the kind described during the frame flyback periods of the scanning beam, and each frame flyback period is divided into two intervals during the first of which the tube is pulsed in the manner disclosed in the aforesaid application in order to charge the storage surface of the tube negatively, while during the second interval of the frame flyback period the film is projected onto the tube to form the charge pattern on the storage surface, whereafter the charge pattern is evaluated by the scanning beam. The two time intervals of the frame flyback period are preferably separate from each other so that there is no overlapping between the negative charging of the storage surface by the pulsing process and the developement of the charge pattern on the storage surface in response to the projected picture.

For obtaining the required negative shift of the storage surface potential, the tube is preferably pulsed simultaneously with diffuse light pulses and voltage pulses as described in the aforesaid application, these pulses being applied in accordance with the present invention during the first of the above-mentioned two intervals of the frame flyback period. The present invention may be carried out with the use of video storage tubes of normal types of construction with the addition of only simple apparatus for producing the pulses, similarly as disclosed in the aforesaid application, or if desired, the novel construction of tube also disclosed in the aforesaid application may be utilized.

The output signal obtained from the tube may be fed through a clipping or contra-pulsing device for cutting off the large amplitude pulses produced during the frame flyback periods, and an amplifier to which the output signal from the tube is fed may also be blanked during the frame flyback periods to suppress any portions of these pulses remaining after clipping.

In order that the invention may be more clearly understood, reference will now be made to the accompanying schematic drawings, in which Fig. 1 depicts one embodiment of the invention.

Figures 1, 2, 3, 4:
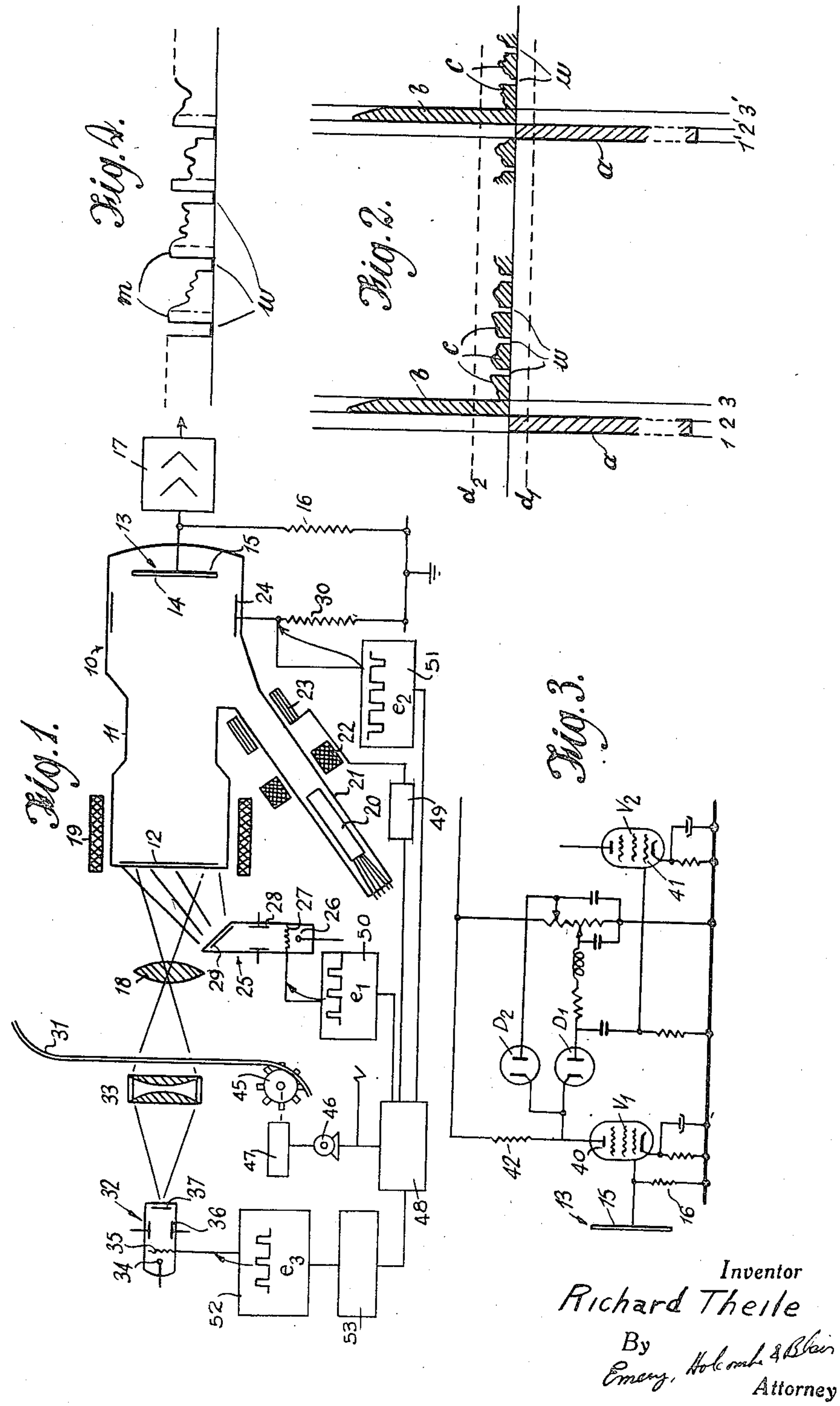
Fig. 2 is a typical waveform diagram illustrating the signal current waveform obtained from the tube.
Fig. 3 is a circuit diagram of a pulse amplitude limiter associated with the tube amplifier.
Fig. 4 is a waveform diagram illustrating a method of providing in the output signal a reference level for "D. C. restoration."

In the embodiment depicted in Fig. 1, a video storage tube 10 of the image iconoscope type is utilized, since a practical form of the invention may be easily realised with this type of tube. The tube 10 is of a normal construction for this type of tube and essentially comprises an evacuated, generally cylindrical envelope 11 having a homogeneous photo-cathode 12 on the internal surface or adjacent thereto at one end of the envelope, and a charge storage target 13 parallel to the photo-cathode and spaced therefrom towards the other end of the envelope. The target 13 consists of a thin insulating sheet 14, usually of mica, which is backed by a continuous conductive layer 15 forming the signal plate. The surface of the sheet 14 which faces the photo-cathode 12 constitutes the storage surface and may be treated so that it has a high secondary electron emissivity. The storage surface 14 may be regarded as consisting of a multiplicity of elementary condenser plates, each insulated from the others but each having capacity to the signal plate 15 which constitutes the common electrode of all the storage capacities and is connected externally of the tube to a load resistor 16 feeding into a signal pre-amplifier 17. Photo-electrons emitted from the photo-cathode under the influence of a light image focussed thereon by a suitable lens system 18 are accelerated and focussed on to the storage surface by the field of an image focussing coil 19 surrounding the envelope 11. The storage surface 14 is scanned in a line raster by a high velocity electron beam generated by an electron gun 20 in a side tube 21 of the envelope 11, the side tube being surrounded by the necessary coils 22 and 23 respectively for focussing and deflecting the beam. A collector electrode 24 is arranged in the envelope 11, usually in the form of an internal conducting coating on the envelope wall, for collecting secondary electrons emitted from the storage surface 14 both by the incident primary photo-electrons from the photo-cathode 12 and by the incident electrons from the scanning beam.

In carrying out the present invention, the tube 10 is operated in the improved manner disclosed in the aforesaid application, to which reference is hereby made for a fuller explanation, so that the mean potential of the storage surface 14 is shifted negatively by pulse charging during the frame flyback periods. For this purpose, similarly as disclosed in the aforesaid application, the storage surface 14 is irradiated with pulses of diffuse electrons obtained by irradiating the photo-cathode 12 with pulses of diffuse light. A suitable light source for this purpose is shown as a miniature cathode ray tube 25 having a simple triode structure comprising a cathode 26, a control electrode 27 and an anode 28 which cooperate to direct an electron stream on to the fluorescent screen 29 of the tube 25 so as to produce diffused luminescence thereof for illuminating the photo-cathode 12, the light output of the fluorescent screen 29 being pulsed by application of suitable voltage pulses $e_1$ to the control electrode 27 so as to obtain corresponding pulse emission of electrons from the photo-cathode. The afterglow of the fluorescent screen 29 must be of short duration in order to avoid prolongation of the light pulses into the picture projection time to be later mentioned. The pulses of electrons thereby released from the photo-cathode 12 are accelerated and imaged on to the storage surface 14 and impinge thereon in a diffuse stream at high velocity to cause secondary emission from that surface. Simultaneously with the application of the pulses $e_1$ to the light source, suitable negative voltage pulses $e_2$ are injected into a resistor 30 inserted in series with the collector 24 of the tube 10 so as to cause these negative pulses to appear at the collector 24. The pulses $e_1$ and $e_2$ are of equal duration and are applied during a portion of the frame flyback periods of the scanning beam from the gun 20, as will be more fully explained below.

For the television transmission of a cinematograph film 31, the film is projected intermittently on to the tube 10 by means of a normal film projector (not shown) so that each picture frame on the film in succession is illuminated, while stationary in the film projector, by light from a light source 32 which is projected through the film by a suitable lens system 33 and focussed by the lens system 18 on to the photo-cathode 12 of the tube 10. The light source 32 for the intermittent picture projection is shown as a cathode ray tube of similar construction to that of the tube 25 and comprising a cathode 34, a control electrode 35 and an anode 36 for producing an electron stream to cause luminescence of the fluorescent screen 37 of the tube 32, the latter being controlled to produce intermittent light pulses by means of suitable voltage pulses $e_3$ applied to the control electrode 35 of the tube.

Each whole frame period of the television transmission is divided into three successive time intervals. In Fig. 2, a whole frame period is represented by the time interval 1—1', of which the interval 1—3 represents the frame flyback period and the interval 3—1' represents the frame scanning period, the frame flyback period 1—3 being sub-divided into two intervals 1—2 and 2—3.

The numerals 1′, 2′, 3′ denote the commencements of the corresponding intervals of the next succeeding frame period. For the duration of the first time interval 1—2 of the frame period 1—1′ the voltage pulses $e_1$ and $e_2$ are applied simultaneously and respectively to the control electrode 27 of the tube 25 and to the collector 24 of the tube 10 so as to effect the negative charging of the storage surface 14 as described. During the following interval 2—3 the image of the then stationary film frame is projected on to the photo-cathode 12, whereby the charge pattern is developed on the storage surface 14 under optimum conditions. During the third interval 3—1′ the charge pattern is evaluated by the scanning beam, again under high efficiency conditions as most of the secondary electrons emitted from the storage surface 14 are being collected by the collector 24. Picture projection and scanning restore the normal equilibrium condition of the storage surface 14, its potential shift in the negative direction being reinstated during the first interval 1′—2′ of the following cycle.

The signal voltage at the input of the amplifier 17 is given by the product of the signal plate current obtained at the signal plate 15 and the load resistance, provided that the effects due to the total amplifier input capacity are negligible, i. e., that the value of the load resistance is sufficiently low. It is customary, however, to adopt relatively high values for the load resistance in order to obtain good signal to noise ratio. Under these circumstances, the resulting differentiation requires to be compensated in the amplifier, but when this is correctly carried out, the amplifier output voltage is still proportional to the signal plate current. Therefore, a time analysis of the output of the tube 10 involves only an analysis of the signal plate current.

In the following analysis, no consideration is given to second order effects, such as those due to the redistribution of the small number of residual secondary electrons, as experimental results and an oscillographic investigation have shown that consideration of the fundamental processes only, give results which are sufficiently nearly correct.

During the pulse charging interval (1—2 or 1′—2′) there is present substantially only the primary current originating from the pulsed photo-cathode 12, since under the described operating conditions the collection of secondary emission by the collector 24 is substantially suppressed, due to the negative voltage pulse $e_2$ on the collector. This gives rise to the current *a* which is plotted in a negative direction, as the resulting voltage developed at the input of the amplifier 17 is negative relatively to ground potential.

During the picture projection interval 2—3, the collector 24 has reverted to its normal potential and is, therefore, positive relatively to the negatively charged storage surface 14, so that the required conditions exist for obtaining improved collection of the secondary emission from the storage surface. Consequently, during the interval 2—3, the charge pattern is developed on the storage surface 14 in response to the light image on the photo-cathode 12, the storage surface being discharged in the positive direction to a greater or lesser extent from point to point over its surface according to the light distribution in the image. This discharge of the storage surface gives rise to a positive-going current pulse *b* which represents the average current corresponding to the integral of the elementary currents over the whole storage surface. During the scanning interval 3—1′, the scanning beam erases the remaining charge on the storage surface, completing the process of discharging it to normal equilibrium potential (normal collector potential), and thus produces the positive-going varying video signal current *c* periodically interrupted at the line flyback periods by the line blanking pulses *w* the signal level of which corresponds to peak white. The amplitude of the video signal developed during scanning is of decreasing value with increasing light level, i. e. the sense of the developed picture is of similar polarity to that obtained with the normal mode of operation of an image iconoscope type of tube.

The means for cooperatively linking the pulses $e_1$, $e_2$, $e_3$ with the scanning cycle of the tube 10 and the movement of the film 31 are as follows. A conventional drive sprocket 45 for the film 31 is arranged to be driven by a synchronous motor 46 through an intermittent drive mechanism, schematically illustrated at 47, the motor 46 being connected to alternating current mains as shown. Also connected to the mains is a master-waveform generator 48 which produces master oscillations for a scanning waveform generator 49 connected to the coils 23 of the tube 10, for pulse generators 50 and 51 for forming the pulses $e_1$ and $e_2$ respectively, and for a pulse generator 52 for producing the pulses $e_3$. Because the pulses $e_3$ must be produced after the simultaneously-produced pulses $e_1$ and $e_2$, as mentioned above, a suitable delay circuit, schematically illustrated at 53 is inserted between the master waveform generator 48 and the pulse generator 52. The constitution of the waveform generators 48, 49, 50 and 51 and the delay circuit 53 may follow any of the conventional designs well known in the art and since such devices are so well known, there is no need to illustrate them here. Correct synchronisation between all the waveform generators and the drive for the film 31 is thus assured by their connection to a common alternating current supply.

It may be seen from Fig. 2 that information regarding the mean light level of the picture being transmitted is given during the scanning interval, i. e. the output video signal current contains D. C. components. These components may be retained during the passage through a resistance-capacity coupled amplifier by the use of a D. C. restorer referring to the line blanking pulses.

The method of operation described above makes it necessary that some restriction be placed on the amplitude of the signals passed to the amplifier 17. As will be apparent from Fig. 2, the average video signal amplitude is considerably smaller than the charge and discharge pulse amplitudes, and since these charge pulses *a* and discharge pulses *b* contain no useful information it is desirable that they be eliminated at the amplifier, or at least restricted in amplitude to the limits imposed by the maximum excursion of the video signal. One suitable amplifier arrangement for obtaining this amplitude restriction is illustrated as an example in Fig. 3. The amplitude limitation is carried out by means of two diodes $D_1$ and $D_2$. The diode $D_1$ limits negative-going signals at the amplifier input by interrupting the connection between the anode 40 of the tube $V_1$ and the grid 41 of the tube $V_2$. The diode $D_2$ limits in the other direction by effectively short-circuiting the anode load resistor 42 of the tube $V_1$. The diode $D_2$ must be of low impedance. By suitable adjustment of the diode biasing voltages it is possible to impose such limitations that only signals appearing between the levels $d_1$ and $d_2$ in Fig. 2 are transmitted.

Transmitted pictures obtained with the described method and apparatus have been found to compare favourably with those obtained from high quality film transmission devices as now customarily used, such as image dissectors and flying spot scanners. An advantage of the present invention is that it permits a camera of a type usable for normal direct pick-up transmissions to be used also for film transmission purposes, and it is no longer necessary to construct and reserve special units for film transmission only. A further advantage of the invention over flying spot scanning methods and devices is that a complete image of the stationary film in the projector gate may be viewed before transmission commences.

For D. C. restoration during film transmission it is preferable to provide a restoration reference level by insertion of a black strip at the left-hand side of the picture, which can be scanned within the line flyback period so that at the commencement of every line restoration is provided to black level, instead of to peak white. The resulting waveform after the insertion of such reference levels is depicted in Fig. 4, in which the pulses $m$ representing the black level correspond to the maximum signal current intensity from which the video signals are built up in a negative direction. It is, of course, possible to use as reference levels the pulses $w$ corresponding to peak white or whiter than white, but although the use of these pulses would avoid the necessity for the insertion of the black strip, there is the disadvantage that variation in the levels of the light pulses or the collector voltage pulses used in the pulse charging process of operating the tube 10 would directly influence the picture black level.

In the case of a tube of the iconoscope type, the invention may be applied in a similar manner to that above described in the case of a tube of the image iconoscope type, by providing a large-area electron source, such as a photo-cathode, and arranging to pulse that source with light pulses to cause it to give off pulses of electrons to flood the sensitive mosaic target of the iconoscope.

Although cathode ray tubes are depicted as intermittent light sources, and are preferred for this purpose as they may be easily controlled by voltage pulses applied to their control electrodes, it will be apparent that other devices, such as a gas discharge tube or a light source obturated by rotating or vibrating shutters may be utilized to obtain the intermittent light pulses. Moreover, although with a video storage tube of the image iconoscope or iconoscope types the irradiating pulses may be conveniently generated by utilizing the existing photo-cathode or photosensitive mosaic, as the case may be, of the tube in conjunction with an intermittent light source, it will be apparent that as a further alternative an additional electron gun may be included in the tube from which irradiating electron pulses may be derived directly.

It is to be understood that all matter described in the aforesaid copending application which is applicable to film transmission in accordance with the invention herein disclosed is to be regarded as embraced within the scope of the present disclosure.

I claim:

1. Television apparatus comprising a video storage tube having a charge storage surface associated with a signal plate and adapted to form a charge pattern in response to a light image incident upon the storage surface, means for scanning said surface with a high velocity electron beam to discharge said surface to an equilibrium potential, a collector electrode for collecting electrons emitted from the storage surface under the action of the scanning beam and of the incident light image, a large-area source of electrons, means for energising said large-area source to cause it to emit electrons, electron-optical means for forming an image of said large-area source on said charge-storage surface to cause the latter to emit electrons, means operable for a time interval at the commencement of each frame flyback period of the scanning beam for pulsing said large-area source to cause electron emission from the storage surface, and means operable simultaneously with and for the same duration as said pulsing means, for applying a field in the neighbourhood of the storage surface to cause the emitted electrons to return to that surface, whereby to charge the storage surface negatively during said time interval and thereby shift its potential negatively from said equilibrium value attained by the discharging action of the scanning beam, and means operable during a second succeeding time interval of each frame flyback period for projecting a light image from a stationary film on to said tube to form a charge pattern responsive to said light image on the storage surface.

2. Television apparatus comprising a video storage tube having a charge storage surface associated with a signal plate and adapted to form a charge pattern in response to an electron image incident upon the storage surface, means for scanning said surface with a high velocity electron beam to discharge said surface to an equilibrium potential, a collector electrode for collecting electrons emitted from the storage surface under the action of the scanning beam and of the incident electron image, a large-area source of electrons, means for energising said large-area source to cause it to emit electrons, electron-optical means for forming an image of said large-area source on said charge storage surface to cause the latter to emit electrons, means operable for a time interval at the commencement of each frame flyback period of the scanning beam for pulsing said large-area source to cause electron emission from the storage surface, and means operable simultaneously with and for the same duration as said pulsing means, for applying a field in the neighbourhood of the storage surface to cause the emitted electrons to return to that surface, whereby to charge the storage surface negatively during said time interval and thereby shift its potential negatively from said equilibrium value attained by the discharging action of the scanning beam, and means operable during a second succeeding time interval of each frame flyback period for projectnig a light image from a stationary film onto said tube to form a charge pattern responsive to said light image on the storage surface.

3. Television apparatus as claimed in claim 2 comprising a cathode ray tube having a beam control electrode, means for applying voltage pulses to said control electrode for controlling the light output of said tube directed onto a photo-cathode in said storage tube, and means for focussing photo-electrons released from said photo-cathode onto an electron image on said storage surface whereby said charge storage surface is irradiated by electron bombardment from said photo-cathode in pulses at the commencement of each flyback period of the scanning beam in addition to the normal photo-electrons emitted as a result of the light image of the film.

4. Television apparatus as claimed in claim 2, comprising a cathode ray tube having a beam control electrode, means for applying voltage pulses to said control electrode for controlling the light output of said tube directed onto a photo-cathode in said storage tube, means for focussing photo-electrons released from said photo-cathode onto an electron image on said storage surface whereby said charge storage surface is irradiated by electron bombardment from said photo-cathode in pulses at the commencement of each flyback period of the scanning beam in addition to the normal photo-electrons emitted as a result of the light image of the film, and means operable simultaneously with and for the same duration as the voltage pulses to said control electrode, for applying negative pulses to the collector electrode to cause the emitted electrons to return to the charge storage surface.

5. Television apparatus comprising a video storage tube having a charge storage surface associated with a signal plate and adapted to form a charge pattern in response to a light image incident upon the storage surface, means for scanning said surface with a high velocity electron beam to discharge said surface to an equilibrium potential, a collector electrode for collecting electrons emitted from the storage surface under the action of the scanning beam and of the incident light image, a large-area source of electrons, means for energising said large-area source to cause it to emit electrons, electron-optical means for forming an image of said large-area source on said charge storage surface to cause the latter to emit electrons, means operable for a time interval at the commencement of each frame flyback period of the scanning beam for pulsing said large-area source to cause electron emission from the storage surface, and means operable simultaneously with and for the same duration as said pulsing means, for applying a field in the neighbourhood of the storage surface to cause the emitted electrons to return to that surface, whereby to charge the storage surface negatively during said time interval and thereby shift its potential negatively from said equilibrium value attained by the discharging action of the scanning beam, an intermittent light source for illuminating the film while stationary, and means for controlling the light output of said source intermittently in timed relation with the intermittent film feed during a second succeeding time interval of each frame flyback period for projecting a light image from said film onto said tube to form a charge pattern responsive to said light image on said storage surface.

6. Television apparatus as claimed in claim 5, in which said light source comprises a cathode ray tube having a beam control electrode, and means for applying voltage pulses to said control electrode for controlling the light output of said tube.

7. Television apparatus comprising a video storage tube having a charge storage surface associated with a signal plate and adapted to form a charge pattern in response to an electron image incident upon the storage surface, means for scanning said surface with a high velocity electron beam to discharge said surface to an equilibrium potential, a collector electrode for collecting electrons emitted from the storage surface under the action of the scanning beam and of the incident electron image, a large-area source of electrons, means for energising said large-area source to cause it to emit electrons, electron optical means for forming an image of said large-area source on said charge-storage surface to cause the latter to emit electrons, means operable for a time interval at the commencement of each frame flyback period of the scanning beam for pulsing said large-area source to cause electron emission from the storage surface, and means operable simultaneously with and for the same duration as said pulsing means, for applying a field in the neighbourhood of the storage surface to cause the emitted electrons to return to that surface, whereby to charge the storage surface negatively during said time interval and thereby shift its potential negatively from said equilibrium value attained by the discharging action of the scanning beam, an intermittent light source for illuminating the film while stationary and means for controlling the light output of said source intermittently in timed relation with the intermittent film feed during a second succeeding time interval of each frame flyback period for projecting a light image from said film onto said tube to form a charge pattern responsive to said light image on said storage surface.

8. Television apparatus as claimed in claim 7, in which said light source comprises a cathode ray tube having a beam control electrode, and means for applying voltage pulses to said control electrode for controlling the light output of said tube.

9. Television apparatus comprising a video storage tube having a charge storage surface associated with a signal plate and adapted to form a charge pattern in response to a light image incident upon the storage surface, means for scanning said surface with a high velocity electron beam to discharge said surface to an equilibrium potential, a collector electrode for collecting electrons emitted from the storage surface under the action of the scanning beam and of the incident light image, a large-area source of electrons, means for energising said large-area source to cause it to emit electrons, electron-optical means for forming an image of said large-area source of said charge storage surface to cause the latter to emit electrons, means operable for a time interval at the commencement of each frame flyback period of the scanning beam for pulsing said large-area source to cause electron emission from the storage surface, and means operable simultaneously with and for the same duration as said pulsing means, for applying a field in the neighbourhood of the storage surface to cause the emitted electrons to return to that surface, whereby to charge the storage surface negatively during said time interval and thereby shift its potential negatively from said equilibrium value attained by the discharging action of the scanning beam, means operable during a second succeeding time interval of each frame flyback period for projecting a light image from a stationary film onto said tube to form a charge pattern responsive to said light image on the storage surface, a signal amplifier connected to the output of said tube, and means for cutting off from the output of said amplifier the negative output pulses produced by the application of the charging pulses to the tube and the positive output pulses produced by the discharging action of the scanning beam during the said respective intervals of each frame flyback period.

10. Television apparatus as claimed in claim 9, in which said amplifier includes two diodes operable respectively to limit negative-going and positive-going signals at the amplifier input.

11. Television apparatus comprising a video storage tube having a charge storage surface associated with a signal plate and adapted to form a charge pattern in response to an electron image incident upon the storage surface, means for scanning said surface with a high velocity electron beam to discharge said surface to an equilibrium potential, a collector electrode for collecting electrons emitted from the storage surface under the action of the scanning beam and of the incident electron image, a large-area source of electrons, means for energising said large-area source to cause it to emit electrons, electron optical means for forming an image of said large-area source on said charge storage surface to cause the latter to emit electrons, means operable for a time interval at the commencement of each frame flyback period of the scanning beam for pulsing said large-area source to cause electron emission from the storage surface, and means operable simultaneously with and for the same duration as said pulsing means, for applying a field in the neighbourhood of the storage surface to cause the emitted electrons to return to that surface, whereby to charge the storage surface negatively during said time interval and thereby shift its potential negatively from said equilibrium value attained by the discharging action of the scanning beam, means operable during a second succeeding time interval of each frame flyback period for projecting a light image from a stationary film onto said tube to form a charge pattern responsive to said light image on the storage surface, a signal amplifier connected to the output of said tube, and means for cutting off from the output of said amplifier the negative output pulses produced by the application of the charging pulses to the tube and the positive output pulses produced by the discharging action of the scanning beam during the said respective intervals of each frame flyback period.

12. Television apparatus as claimed in claim 11, in which said amplifier includes two diodes operable respectively to limit negative-going and positive-going signals at the amplifier input.

RICHARD THEILE.

References Cited in the file of this patent

UNITED STATES PATENTS

| Number | Name | Date |
|---|---|---|
| 2,083,995 | Henroteau | June 15, 1937 |
| 2,146,822 | Henroteau | Feb. 14, 1939 |
| 2,147,760 | Vance | Feb. 21, 1939 |
| 2,164,520 | Henroteau | July 4, 1939 |
| 2,242,952 | Hergenrother | May 20, 1941 |
| 2,324,534 | Pierce | July 20, 1943 |
| 2,352,488 | Mayle | June 27, 1944 |
| 2,451,640 | Thalner | Oct. 19, 1948 |
| 2,483,149 | Norgaard | Sept. 27, 1949 |
| 2,496,102 | McCord | Jan. 31, 1950 |
| 2,499,181 | Downes et al. | Feb. 28, 1950 |